(12) United States Patent
Martin (10) Patent No.: US 9,258,625 B2
(45) Date of Patent: Feb. 9, 2016

(54) METHOD AND SYSTEM FOR LOAD BALANCING BETWEEN A VIDEO SERVER AND CLIENT

(75) Inventor: Walter Andrew Martin, Belfast (GB)

(73) Assignee: Sensormatic Electronics, LLC, Boca Raton, FL (US)

(*) Notice: Subject to any disclaimer, the term of this patent is extended or adjusted under 35 U.S.C. 154(b) by 390 days.

(21) Appl. No.: 13/089,503

(22) Filed: Apr. 19, 2011

(65) Prior Publication Data

US 2012/0271948 A1 Oct. 25, 2012

(51) Int. Cl.
*H04N 21/658* (2011.01)
*H04N 21/239* (2011.01)
*H04N 21/24* (2011.01)
*H04N 21/258* (2011.01)
*H04N 21/442* (2011.01)

(52) U.S. Cl.
CPC ....... *H04N 21/6582* (2013.01); *H04N 21/2393* (2013.01); *H04N 21/2405* (2013.01); *H04N 21/25808* (2013.01); *H04N 21/4424* (2013.01)

(58) Field of Classification Search
CPC .............. H04L 65/604; H04L 67/2823; H04L 67/1002; H04L 67/101; H04L 65/60; H04L 63/1408; H04L 67/2819; H04L 29/08945; H04N 21/6582; H04N 21/2393; H04N 21/2405; H04N 21/25808; H04N 21/4424
USPC ........................... 709/223, 219, 231; 455/466
See application file for complete search history.

(56) References Cited

U.S. PATENT DOCUMENTS

| | | | |
|---|---|---|---|
| 7,069,301 B2 * | 6/2006 | Jerbi et al. | 709/206 |
| 7,548,755 B2 * | 6/2009 | Kim | 455/466 |
| 7,555,006 B2 * | 6/2009 | Wolfe et al. | 370/465 |
| 7,555,715 B2 * | 6/2009 | Randall et al. | 715/249 |
| 8,151,308 B1 * | 4/2012 | Chauvin et al. | 725/88 |
| 8,301,697 B2 * | 10/2012 | Sethi et al. | 709/204 |
| 8,370,732 B2 * | 2/2013 | Black et al. | 715/205 |
| 8,484,358 B2 * | 7/2013 | Swenson et al. | 709/227 |
| 8,654,640 B2 | 2/2014 | Ulm | 370/232 |
| 8,706,910 B2 * | 4/2014 | Taylor et al. | 709/246 |
| 2005/0289617 A1 * | 12/2005 | Safadi et al. | 725/89 |
| 2006/0112169 A1 * | 5/2006 | Bodlaender et al. | 709/217 |
| 2007/0130361 A1 * | 6/2007 | Li | 709/231 |
| 2008/0168146 A1 * | 7/2008 | Fletcher | 709/206 |
| 2008/0201748 A1 | 8/2008 | Hasek et al. | |

(Continued)

FOREIGN PATENT DOCUMENTS

WO 2011/009205 A1 1/2011

OTHER PUBLICATIONS

International Search Report and Written Opinion dated Jul. 17, 2012 for International Application Serial No. PCT/GB2012/050842, International Filing Date: Apr. 17, 2012, consisting of 16 pages.

*Primary Examiner* — Uzma Alam
(74) *Attorney, Agent, or Firm* — Christopher & Weisberg, P.A.

(57) ABSTRACT

A method and system for balancing the load and resource requirements in a digital video distribution system between a video server and its video clients by allowing the server and the clients to exchange resource capabilities with each other. Upon receipt of a request for a video stream from among available video content, the server determines whether it or the requesting client should scale the video stream based on which entity, client or server, is better equipped to scale the requested video stream to comply with the requesting client's resources and resolution capacity.

17 Claims, 4 Drawing Sheets

(56) References Cited

U.S. PATENT DOCUMENTS

2008/0205389 A1 8/2008 Fang et al.
2009/0138966 A1* 5/2009 Krause et al. .................. 726/21
2009/0144795 A1 6/2009 Yu et al.
2010/0017516 A1 1/2010 Sparrell et al.
2010/0070608 A1* 3/2010 Hosur .......................... 709/218
2010/0121936 A1* 5/2010 Liu et al. ...................... 709/217
2011/0087749 A1* 4/2011 Swink et al. ................. 709/206
2012/0054312 A1* 3/2012 Salinger ....................... 709/219

* cited by examiner

METHOD AND SYSTEM FOR LOAD BALANCING BETWEEN A VIDEO SERVER AND CLIENT

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to video distribution systems and, in particular, to a method and system for intelligently sharing computer resources between a network video recorder and one or more client computers within a video distribution network.

BACKGROUND OF THE INVENTION

A Network Video Recorder ("NVR") is an Internet Protocol ("IP") based device that is coupled to a communication network. An NVR is a digital server that receives digital images and/or video streams over the network and records them in a digital format. Because they are IP based, NVRs may be managed remotely via, for example, a local area network ("LAN") or over the Internet. NVRs can simultaneously record and remotely access live video streams from IP cameras.

NVR servers typically send video data to client computers at a resolution that is not ideally matched to the display resolution of the client. This is inefficient for network bandwidth utilization and also client side CPU utilization. For example, if a client is attempting to display 16 images in a 4×4 matrix, the required resolution for each image may be quite modest. However, the server could unnecessarily be delivering 16 D1 or megapixel resolution streams to the client. This wastes network bandwidth and puts the client computer under a much heavier computing load than is necessary. This is particularly important with resource-intensive CODECs such as those using H.264 or MPEG-4 compression standards.

Typically, the above-described problem is alleviated by utilizing a video capture device that is capable of delivering more than one simultaneous stream, where one stream will be delivered for recording and another for live viewing at the client computer. However, multiple streaming from the video capture device is far from the ideal solution. For one, NVR servers are required to support multiple client connections. Therefore, it is not feasible to expect a capture device to deliver the multitude of resolutions that may be required to deliver video to perhaps ten or more separate clients, where each may require different resolutions. Second, this attempt provides no solution for the playback of stored video on the client computer.

Therefore, what is needed is a system and method for intelligently sharing the computer load and network bandwidth between a video server and client computers to allow the video distribution system to minimize network bandwidth while also efficiently distributing available computer resources across the network.

SUMMARY OF THE INVENTION

The present invention advantageously provides a method and system for intelligently sharing the load and resource requirements in a digital video distribution system between a video server and its video clients by allowing the server and the clients to exchange resource capabilities with each other. Upon receipt of a request for a video stream from among available video content, the server determines whether it or the requesting client should scale the video stream based on which entity, client or server, is better equipped to scale the requested video stream to comply with the requesting client's resources and resolution capacity. In one aspect of the invention, a method for load balancing between a video server and video client in a video distribution network is provided. The method includes receiving from the at least one video client a request for a video stream from a listing of available video content, the requested video stream conforming to a resource capability of the at least one video client, determining if the request for the video stream is from a client having the lowest resource capability from among the at least one video client, if the requesting client has the lowest resource capability from among the at least one video client, calculating required resources to provide the requesting client with a selected video stream meeting the requesting client's resource capability, and balancing the resources in the video distribution network by determining whether the video server is to transcode the selected video stream.

In another aspect of the invention, a system for load balancing between a video server and video client in a video distribution network is provided. The system includes a database containing a listing of available video content and a video server in communication with the database. The video server is adapted to receive a request from a video client for a video stream from a listing of available video content, the requested video stream conforming to a resource capability of the requesting video client and determine if the request for the video stream is from a client having the lowest resource capability from among the at least one video client. If the requesting client has the lowest resource capability from among the at least one video client, the video server calculates required resources to provide the requesting client with a selected video stream meeting the requesting client's resource capability and balances the resources in the video distribution network by determining whether the video server is to transcode the selected video stream.

In yet another aspect, a method for load balancing between a video server and at least one video client in a video distribution network is provided. The method includes sending to the video server a request for a video stream from a listing of available video content, sending to the video server resource capabilities corresponding to the requesting video client, the video server balancing the resources in the video distribution network by determining whether the video server or the requesting video client is to scale the selected video stream, and resending a request for the scaled video stream.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components and processing steps related to implementing a video distribution system and method for intelligently sharing computer load between a video server and client computers in a video distribution network to allow the video distribution system to minimize network bandwidth and at the same time distribute available computer resources across the network.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for balancing the load and resource requirements in a digital video distribution system between the server and client computers by allowing the server and the clients to exchange resource capabilities with each other. Such an arrangement also allows efficient use of available network bandwidth. Upon receipt of a request for a video stream from among available video content, the server can determine whether it or the requesting client should scale the video stream based on which entity, client or server, has the requisite processing resources.

Figure 1:
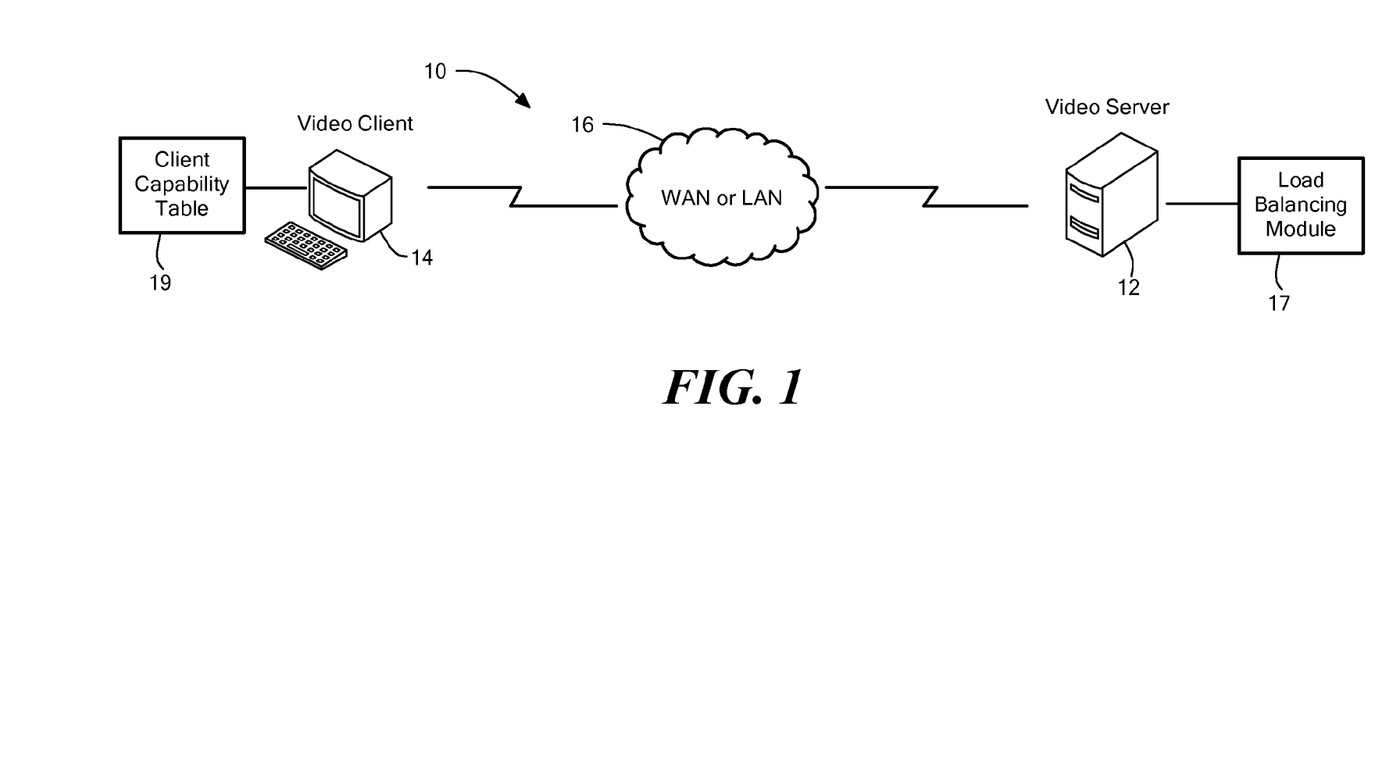
FIG. 1 is a diagram of a system constructed in accordance with the principles of the present invention.

Referring now to the drawing figures in which like reference designators refer to like elements, there is shown in FIG. 1 a video distribution system 10 that includes a video server 12 and one or more video client computers 14. Video server 12 communicates with video client 14 via communication network 16. By way of example, communication network 16 can be a Wide Area Network ("WAN") or Local Area Network ("LAN") communication network. Video server 12 may be an Internet Protocol ("IP") based device capable of capturing digital video content and transmitting this content to video client 14 via communication network 16 such as a Network Video Recorder ("NVR"). Server 12 includes a load balancing module 17 and the hardware such as a CPU, storage memory, I/O interfaces, and software to perform the functions described herein and enable server 12 to receive images from remote IP cameras and to store and manage the video content either within an internal storage device or remotely, at an external location. Server 12 may have an internal database or be connected to an external database that contains stored video content that can be accessed by one or more video clients 14 across network 16. Video client 14 can be any computing device that has the capabilities of playing digital video content, such as, for example, a desktop or laptop computer, a mobile device, e.g., a personal digital assistant ("PDA"), a cellular phone, a tablet, a multimedia player. Video client 14 includes hardware such as memory, a CPU, I/O interfaces, data storage, and software to enable it receive and view digital video images. Although the present invention is described with reference to IP communications, the invention is not limited to such. It is contemplated that any suitable network communication protocol can be used to implement the invention described herein.

Of note, although the terms "video" and "display" are used herein, it is understood that the invention is not limited solely to the display of video-only content. As such, these terms are defined herein to include multi-media content as well as the playback, i.e., display of the video and audible playback of the audio portion, of the content.

It is assumed that each video client 14 in network 16 has limitations as to the type of digital video content it can play. Video content that arrives at video client 14 via network 16 is encoded at server 12 and needs to be decoded at video client 14. Each video stream arriving at video client 14 can be categorized by a specific CODEC ("Encoder/Decoder"), such as CODEC A, CODEC B, CODEC C, etc., as shown in FIG. 1. Video client 14 creates client resource capability table 19 such as the exemplary table represented in TABLE 1 below that stores each video stream made available by server 12 along with the decode resource capability and/or resolution capability of video client 14 to display each stream. As used throughout this specification, the terms "resolution capability" and "resource capability" are used interchangeably to refer to the processing, storage, display and/or decoding capability of video client 14 to decode and/or display the incoming video content.

TABLE 1

| CODEC | Capability (Mb/s) |
| --- | --- |
| CODEC A | x |
| CODEC B | y |
| CODEC C | z |

Due to the complexity of certain video streams and how they are encoded by the source, client 14 may not have the resource capability, to adequately decode and/or display the incoming video content. Thus, video client 14 calculates its capability to decode and display each video stream. Client 14 can subscribe to a service that allows it to access a matrix containing live and recorded video content made available by different servers 12. For example, TABLE 2 below shows a listing of different video streams presented by different sources.

TABLE 2

| Source | CODEC | Data Rate (Mb/s) | Start Time | End Time |
| --- | --- | --- | --- | --- |
| A | CODEC A | x | a | present |
| A | CODEC B | y | b | a |
| B | CODEC C | z | c | present |

Source A provides a video stream (CODEC A) at a particular data rate (x), having a start time (a). Source A also provides CODEC B having a different data rate (y) with different a different start time (b) and end time (a). Source B provides video streams CODEC A and CODEC C. The data rate (z) for CODEC C from Source B is different from the data rate (x) for CODEC A from Source A. Depending upon the data rate for each video stream, client 14 has different resources and capabilities for decoding and displaying the content for that video stream.

Server 12 also creates a table that lists each video stream (i.e., CODEC A, CODEC B, CODEC C) it has made available for distribution across network 16. An exemplary TABLE 3 is represented below.

TABLE 3

| CODEC | Decode Capability (Mb/s) |
|---|---|
| CODEC A | a |
| CODEC B | b |
| CODEC C | c |

Server 12 publishes its live video content availability as well as its recorded video content availability to allow clients 14 in network 16 to select a desired video stream. Server 12 calculates the resources necessary for it to scale or transcode each video stream, if transcoding is necessary. Transcoding, as is well known in the art, is the conversion of one encoding format to another. Transcoding is often necessary when there is a need to adapt digital files such that video content can be viewed on different playback devices. Thus, the video stream that is requested by client 14 may need to be transcoded in order for the video to be played and viewed on client 14.

Advantageously, the present invention allows server 12 to determine whether it or whether the requesting client 14 is better equipped to handle the transcoding process. To do this, server 12 calculates its decoding capability prior to transmission of a video stream and then calculates its encoding capability upon receipt of a request for a video stream from client 14. Server 12 then divides this total by the number of remaining channels that it supports to obtain a per channel resource budget.

Initially, server 12 and client 14 generate tables defining their capability to decode video (and in the case of the client 14, to also display the video). These tables list the available resources normalized to that required to process the lowest video resolution, such as in, for example, Common Intermediate Format ("CIF") for each type of video CODEC. The tables are seeded with conservative values on start up and are refined over time. These tables are updated on a periodic basis, particularly after video stream requests. Additionally, server 12 publishes a list of video streams that it has for live and pre-recorded video. The pre-recorded video table also contains time information as different CODECs may have been used for the same video source over time. Clients 14 within network 16 subscribe to this information and receive new or updated information every time the server updates the information on its tables.

Figure 2:
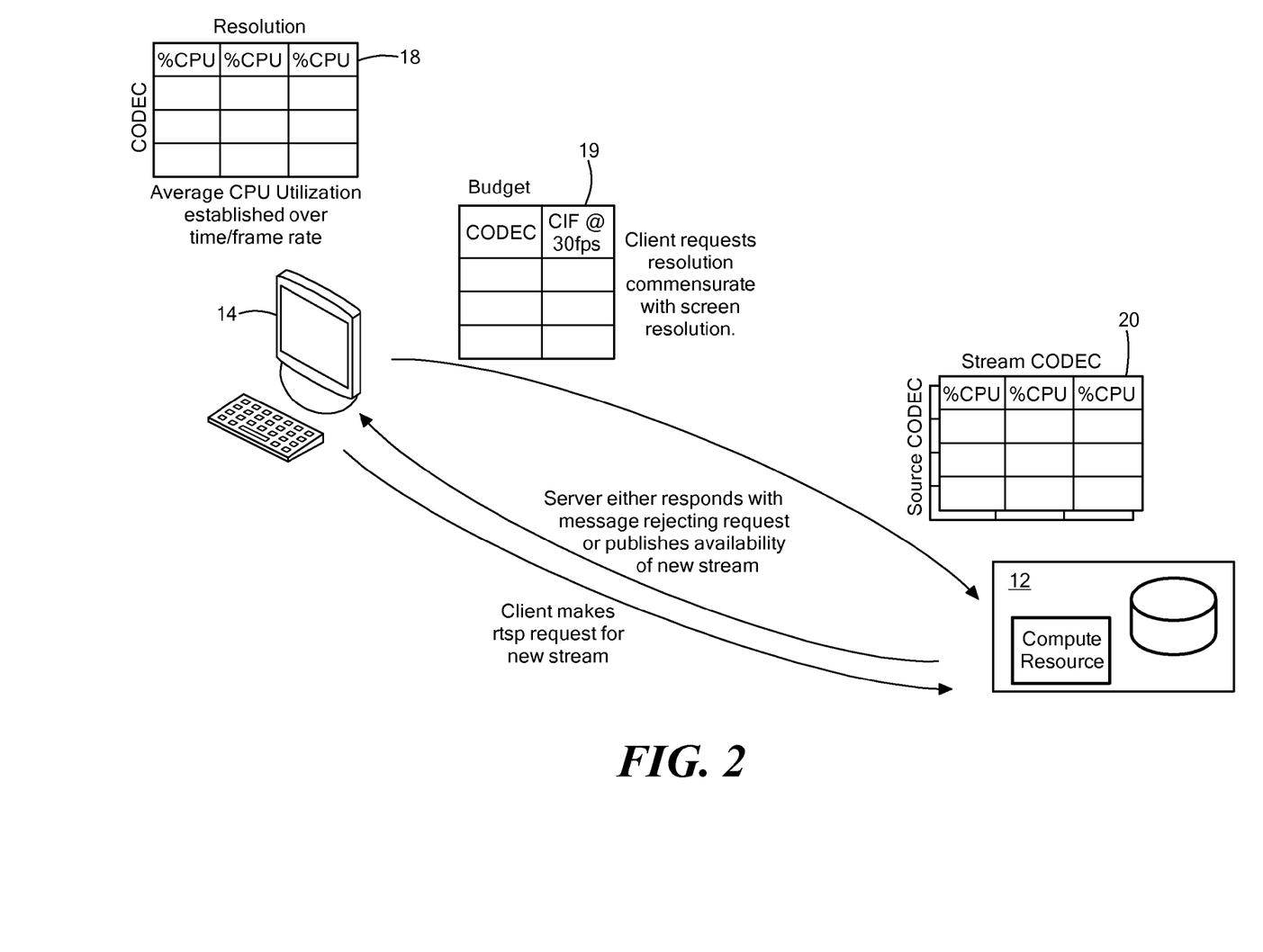
FIG. 2 is a diagram showing the interaction between an NVR server and a client computer in accordance with the principles of the present invention.

FIG. 2 illustrates an exemplary embodiment of the interaction between video server 12 and video client 14 as they communicate in order to balance the processing and network loads when distributing video content through network 16. Client 14 requests video content from server 12 at a resolution commensurate with the client's display resolution requirement illustrated by client capability table 19. Included in the client's request is a measure of available processing resources that client 14 has budgeted in order to be able to process this requested CODEC type. Client 14 also sends to server 12 the client's current CPU and memory utilization. Client 14 maintains a client utilization table 18 containing the average CPU utilization required for each available video stream and is thus able to include, with the request, its resource capabilities for the requested video stream. Upon receipt of the request from client 14, server 12 examines its available content to determine whether server 12 has any video streams within the requesting client's resource capability and makes a decision as to whether the client 14 or the server 12 should scale the requested video. This decision is made by comparing the client resource capability information sent with the request with the available resources on the server 12. As discussed above, server 12 maintains its own table 20 of transcode capability for each CODEC. Server 12 sends a message to client either rejecting the request of client 12 or responds by providing client 12 with information, such as a URL, used by client 14 to retrieve the requested video stream. Where there are multiple client requests to server 12, server 12 services the transcode request from the client 14 with the lowest resources, i.e., CPU and memory, available. Client 14 proceeds to make the video stream request again, such as, for example, via a Real Time Streaming Protocol ("RTSP") request, where the video content has been scaled by server 12 to enable the requesting client 14 to process and display the video content.

Figure 3:
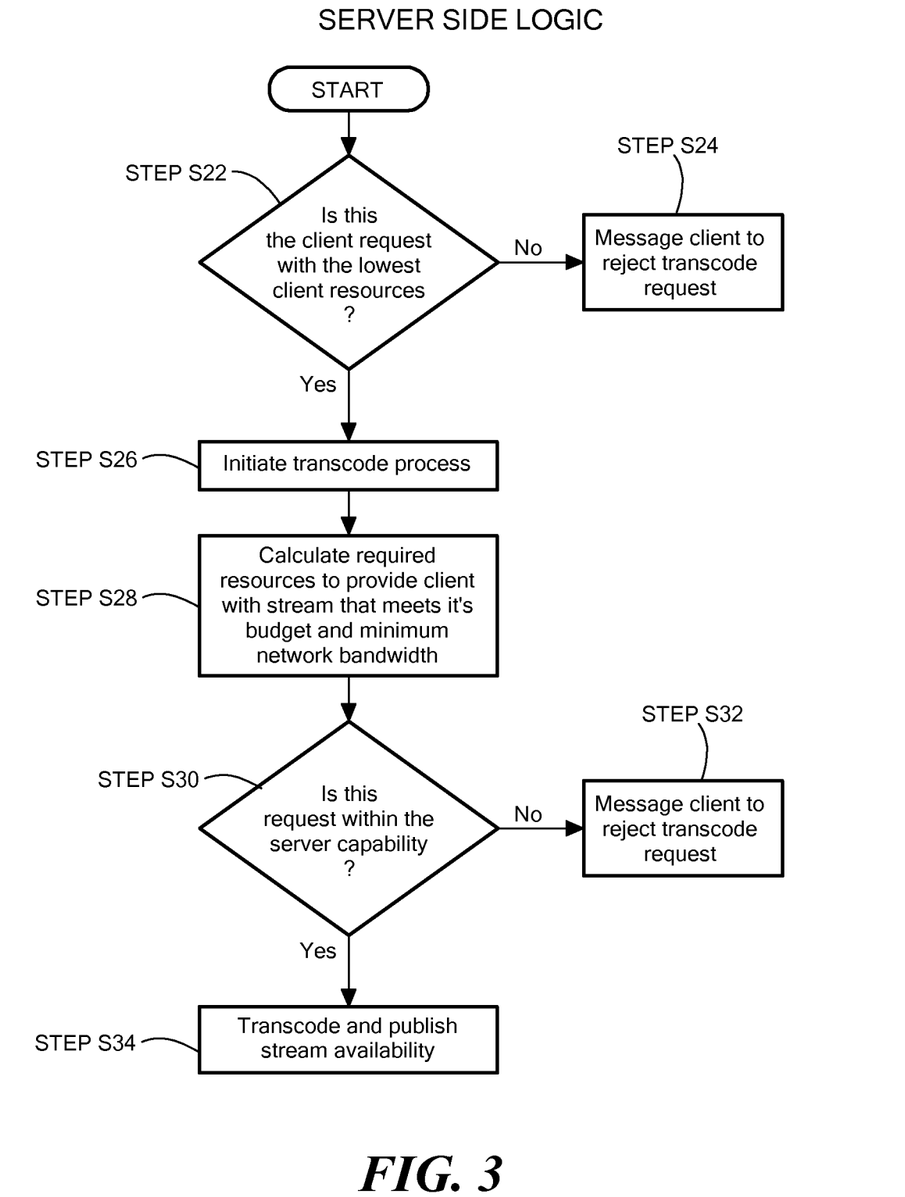
FIG. 3 is a flowchart of an exemplary process performed by an NVR server according to the principles of the present invention.

FIG. 3 is a flowchart of an exemplary process performed by a load balancing module 17, which can be part of the server 12, or in communication with server 12. When one or more video clients 14 in network 16 requests video content from server 12, each client 14 includes with its request its capability to process the requested video stream. The request of each client 14 includes the resource capability of each client 14 to display the video and its ability to decode an encoded video stream and transcode the video signal. Thus, server 12 is aware of the resource capabilities of each requesting client 14. With this information, server 12 determines which client 14 of the requesting clients 14 has the lowest client resources (step S22). If the request is from a client 14 that does not have the lowest client resources of the requesting clients, server rejects the transcode request from that client 14 (step S24). It should be noted that server 12 usually has greater resources than the clients 14 within network 16 since the server 12 has to decode, scale and encode the video content. As criteria for determining whether it has the requisite computer resources to transcode, server 12 may determine if the amount of resources needed to transcode a particular video stream is less than a predetermined amount.

If, at step S22, server 12 determines that the requesting client 14 has the lowest client resources, server 12 will initiate the transcode process (step S26). Server 12 then calculates the required resources necessary to provide client 14 with a video stream that meets the budget requirements and minimum bandwidth of client 14 (step S28). It must then be determined if the client request is within the capability of server 12 (step S30). If the client request is not within the capability of server 12, server 12 sends a message to client 14 rejecting the client's transcode request (step S32). However, if server 12 has the resources to transcode the client request, it performs the transcode operation and publishes the stream availability (step S34).

Figure 4:
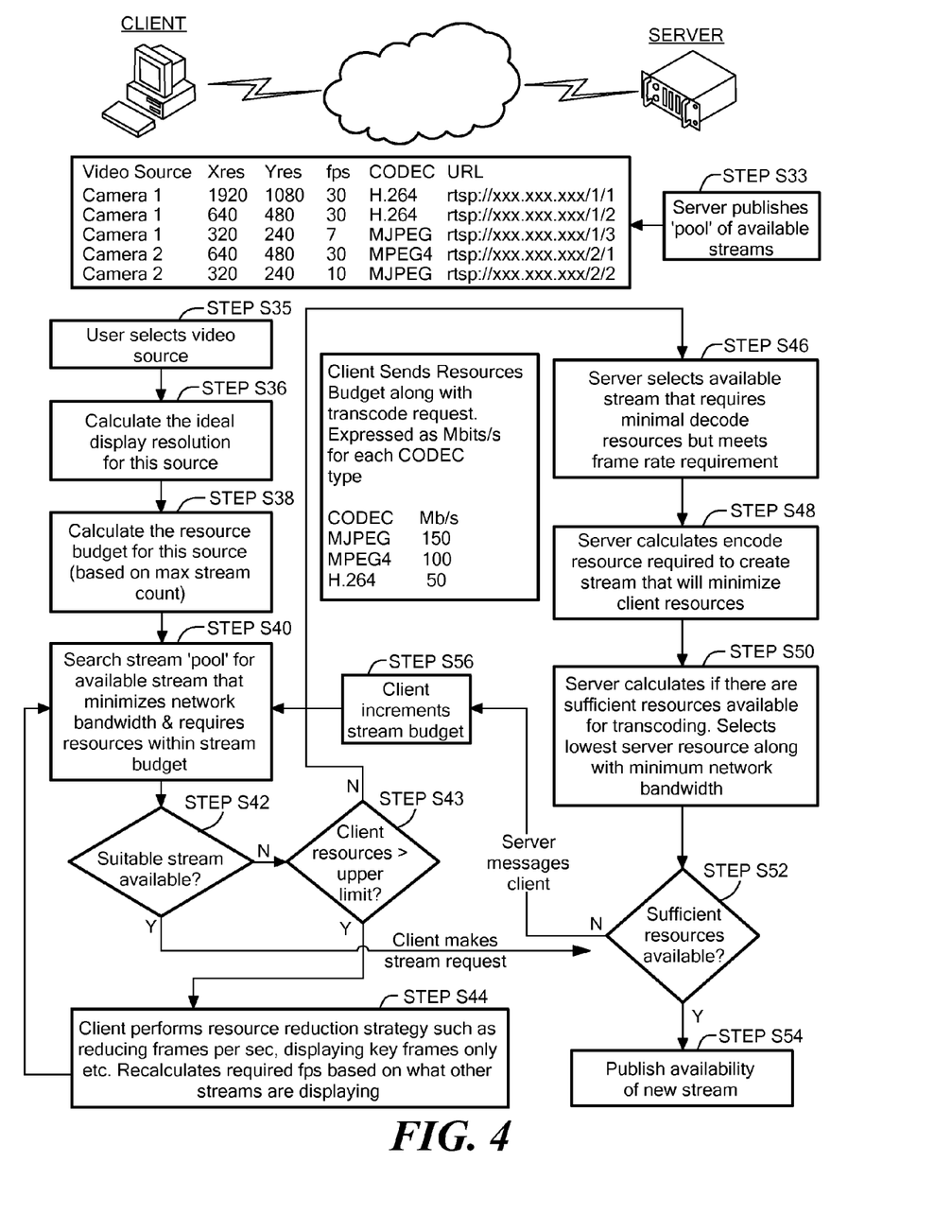
FIG. 4 is a flowchart showing exemplary processes performed by a video client computer and by an NVR server according to the principles of the present invention.

The flowchart of FIG. 4 illustrates an exemplary process taken by server 12 and client 14 utilizing an embodiment of the present invention. Video server 12 publishes a pool of available video streams (step S33). Video client 14 requests a select video stream from the published pool of video content made available by server 12 (step S35). Client 14 calculates the required resources that are needed to play the video based on its display resolution (step S36). The client 14 calculates its capability budget for the selected video stream (step S38). The client resource capability budget is determined based on client factors such as its resolution capability, its CPU capacity, and its ability to decode and display each CODEC type.

Client 14 determines what video stream, from the available content, it can display so as to minimize its CPU load. Once client 14 has done this, client 14 communicates with server 12 to determine whether server 12 has a video stream that is close, i.e., within a predetermined resource difference, to meeting the requirements of client 14 (step S40). Client 14 can adjust its CPU capacity requirements by initially providing an error percentage so that it can search for available video content within a predetermined percentage, i.e., x %, of its ideal CPU load. In one embodiment, x is set to a very low value, and, if necessary, increased if, for example, there are no available video streams within the initial range.

If a suitable video stream is available within the constraints set by client 14 (step S42), client 14 transmits its request to server 12. If no such stream is available, client 14 determines if the maximum of its resources are being utilized (step S43). If resources of client 14 have reached their maximum level, client 14 can apply resource reduction strategies such as reducing the number of frames per second that it can receive, displaying only select frames, and the like until a suitable stream is available (step S44). In one embodiment, client 14 can designate one or more video streams as "priority streams" such that certain critical video streams are allowed to maintain their frame rate even when client resources are low. Once client 14 has adjusted its frame requirements, if necessary, server 12 selects a video stream it has available that minimizes the decode resources of server 12 while meeting the frame rate requirements of client 14 (step S46). Server 12 calculates its encode resource availability based on a variety of factors including the encode requirements that meet the video stream budget for server 12 and the video stream budget for client 14, while minimizing network bandwidth requirements (step S48). If server 12 determines it has sufficient resources available to transcode the video stream (steps S50 and S52), server 12 transcodes the requested video stream, updates its list of available streams to include the video stream with the newly transcoded resolution and publishes the updated list of video stream content (step S54). If server 12 does not have the requisite resources, server 12 rejects the request from client 14 for that particular video stream and sends a message to client 14 to increment the stream budget of client 14, i.e., adjust its video requirements by, for example, increasing the value of "x", such that client 14 can restart its search for an available video stream (step S56).

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embodied in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for resource balancing between a video server and at least one video client in a video distribution network, the method comprising:
   receiving a first request from a video client for a video stream from a listing of available video content, the requested video stream conforming to a resource capability of the requesting video client; and
   balancing the resources in the video distribution network by:
      determining available resources of the video server for transcoding;
      determining available resources of the video client for transcoding;
      comparing the available resources of the video server with the available resources of the video client;
      determining which one of the video server and video client is to transcode the requested video stream based on the comparison; and
      if it is determined that the video server is to transcode:
         rejecting the first request from the video client;
         transcoding the selected video stream at the video server; and
         providing the transcoded video stream to video client upon receipt of a subsequent request from the video client.

2. The method of claim 1 wherein the first request from the video client includes a measure of the available resources of the video client, the available resources of the video client including at least one of memory utilization and CPU utilization of the requesting video client.

3. The method of claim 2, wherein the determining whether one of the requesting video client and video server is to transcode the selected video stream includes comparing the measure of the available resources of the video client received in the first request with available resources of the video server.

4. The method of claim 1, wherein if the video server is not to transcode the video stream, further comprising transmitting a message to the requesting video client indicating that video server will not transcode the selected video stream.

5. The method of claim 1, further comprising generating a transcode resource table defining a capability of the video server to transcode video streams.

6. The method of claim 5, further comprising updating the transcode resource table after each video client request.

7. The method of claim 1, wherein determining available resources at the video server includes calculating transcode resources of the video server.

8. The method of claim 1, further comprising:
   receiving at least one request from at least one other video client;
   determining which one of the video clients has a lowest resource capability; and
   servicing the request from the client with the lowest resource capability before servicing other requests, the servicing including the balancing the resources in the video distribution network.

9. The method of claim 1, wherein transcoding the selected video stream includes using less than a predetermined amount of transcoding resources.

10. A video distribution system for resource balancing between a video server and at least one video client in a video distribution network comprising:
- a database configured to contain a listing of available video content; and
- a video server in communication with the database, the video server, having a non-transitory memory storing software that, when executed by a CPU, configures the video server to:
  - receive a first request from a video client for a video stream from a listing of available video content, the requested video stream conforming to a resource capability of the requesting video client;
  - balance the resources in the video distribution network by:
    - determining available resources of the video server for transcoding;
    - determining available resources of the video client for transcoding;
    - comparing the available resources of the video server with the available resources of the video client;
    - determining which one of the video server and video client is to transcode the requested video stream based on the comparison; and
  - if it is determined that the video server is to transcode:
    - rejecting the first request from the video client;
    - transcoding the selected video stream at the video server; and
    - providing the transcoded video stream to video client upon receipt of a subsequent request from the video client.

11. The system of claim 10, wherein the first request from the video client includes a measure of the available resources of the video client, the available resources of the video client including at least one of memory utilization and CPU utilization of the requesting video client, the available resources of the video server including at least one of memory utilization and CPU utilization of the video server; and
- the comparing the available resources of the video server with the available resources of the video client includes comparing a measure of the at least one of memory utilization and CPU utilization of the video client with the at least one of memory utilization and CPU utilization of the video server.

12. The system of claim 11, wherein the video server is further configured to periodically publish the listing of available video content.

13. The system of claim 10, wherein if the video server is not to transcode the video stream, the video server is further configured to:
- transmit a message to the requesting video client indicating that the server will not transcode the selected video.

14. The system of claim 10, wherein the video server is further configured to generate a transcode capability table defining a capability of the video server to transcode video streams.

15. The system of claim 14, wherein the video server is further configured to update the transcode capability table after each video client request.

16. The system of claim 10, wherein the determining of available resources at the video server includes calculating transcode resources of the video server.

17. The system of claim 10, wherein the video server is further configured to:
- receive at least one request from at least one other video client;
- determine which one of the video clients has a lowest resource capability; and
- service the request from the client with the lowest resource capability before servicing other requests, the servicing including the balancing the resources in the video distribution network.

* * * * *